United States Patent [19]

Schwetz et al.

[11] 4,230,497
[45] Oct. 28, 1980

[54] DENSE SINTERED SHAPED ARTICLES OF POLYCRYSTALLINE α-SILICON CARBIDE AND PROCESS FOR THEIR MANUFACTURE

[75] Inventors: Karl A. Schwetz, Sulzberg; Alfred Lipp, Bad Worishofen, both of Fed. Rep. of Germany

[73] Assignee: Elektroschmelzwerk Kempten GmbH

[21] Appl. No.: 15,154

[22] Filed: Feb. 26, 1979

[30] Foreign Application Priority Data

Mar. 3, 1978 [DE] Fed. Rep. of Germany ....... 2809278

[51] Int. Cl.³ ............................................ C04B 35/56
[52] U.S. Cl. ...................................... 106/44; 106/56; 106/73.4; 264/29.3; 264/65
[58] Field of Search .................... 106/44, 56, 73.4; 264/65, 29.3; 423/345

[56] References Cited

U.S. PATENT DOCUMENTS

| | | | |
|---|---|---|---|
| 3,836,673 | 9/1974 | Weaver et al. | 106/44 |
| 3,966,855 | 6/1976 | Hollenberg et al. | 106/44 |
| 3,998,646 | 12/1976 | Weaver | 106/44 |
| 4,031,178 | 6/1977 | Johnson et al. | 106/44 |
| 4,123,286 | 10/1978 | Coppola et al. | 106/44 |
| 4,124,667 | 11/1978 | Coppola et al. | 106/44 |
| 4,135,937 | 1/1979 | Murata et al. | 106/73.4 |
| 4,141,740 | 2/1979 | Cutler et al. | 106/73.4 |

OTHER PUBLICATIONS

Kraft, E. H. et al.-"Mechanical Response of High Performance Silicon Carbides"-Carborundum Co.-Presented at Second International Conference on Mechanical Behavior of Materials, 16-20, Aug. 76, Boston, Mass.

Primary Examiner—Helen M. McCarthy
Attorney, Agent, or Firm—Burgess, Ryan and Wayne

[57] ABSTRACT

There are provided shaped articles of polycrystalline silicon carbide having densities of at least 97% and improved mechanical properties particularly at high temperatures, said articles consisting of
at least 95.4% by weight of α-silicon carbide,
about 0.1 to 2.0% by weight of additional carbon,
about 0.2 to 2.0% by weight of aluminium,
about 0 to 0.5% by weight of nitrogen, and
about 0 to 0.1% by weight of oxygen, the α-silicon carbide being in the form of a homogeneous microstructure with an average grain size of less than 10 μm.

There is also provided a process for the preparation of such articles by pressureless sintering submicron powder compacts consisting of α-silicon carbide and aluminium- and carbon-containing additives as sintering aids.

23 Claims, 5 Drawing Figures o——o hot-pressed Al-containing α-SiC articles (NC 201, Norton NORALIDE brochure).

□——□ hot-pressed B-containing β-SiC articles having a homogeneous fine-grained structure ▲——▲ hot-pressed B-containing α/β-SiC articles having a coarse-grained structure (S. Prochazka and R. J. Charles "Fracture Mechanics of Ceramics", R. C. Bradt et al (publisher) Plenum, New York (1974), 579)

△——△ B and C-containing α-SiC articles that have been produced by pressureless sintering (E. H. Kraft and G. I. Dooher, Carborundum Comp., 2nd Int. Conf. Mechanical Behaviour of Materials, Aug 1976, Boston, Mass.)

●——● Al and C-containing and, optionally, N-containing α-SiC articles (according to the invention) that have been produced by pressureless sintering

○────○ hot-pressed Al-containing α-SiC articles (NC 201, Norton NORALIDE brochure).

□────□ hot-pressed B-containing β-SiC articles having a homogeneous fine-grained structure.

▲────▲ hot-pressed B-containing α/β-SiC articles having a coarse-grained structure (S. Prochazka and R.J. Charles. "Fracture Mechanics of Ceramics", R.C. Bradt et al (publisher) Plenum, New York (1974), 579).

△────△ B and C-containing α-SiC articles that have been produced by pressureless sintering (E.H. Kraft and G.I. Dooher, Carborundum Comp., 2nd Int. Conf. Mechanical Behaviour of Materials, Aug. 1976, Boston, Mass.).

⊙────⊙ Al and C-containing and, optionally, N-containing α-SiC articles (according to the invention) that have been produced by pressureless sintering.

DENSE SINTERED SHAPED ARTICLES OF POLYCRYSTALLINE α-SILICON CARBIDE AND PROCESS FOR THEIR MANUFACTURE

The present invention relates to a process for the manufacture of dense sintered shaped articles of polycrystalline α-silicon carbide and to a process for the manufacture of such articles by pressureless sintering.

Dense sintered shaped articles of polycrystalline silicon carbide are characterized by such properties as resistance to oxidation, resistance to temperature changes, favorable creeping behavior, relatively low density, low thermal expansion, a high degree of thermal conductivity, and a high degree of hardness. These properties render them useful as, for example, combustion tubes, heat-exchange apparatus and rocket-jet nozzles. Their good mechanical properties also render them useful in the field of abrasion tecnhology, while the semi-conductor properties of silicon carbide renders them useful in electronics and electrical engineering.

Pure silicon carbide cannot, however, be sintered to 100% of its theoretical density even with the use of pressure, and therefore, various additives have been proposed as sintering aids in order to produce moderately dense to dense shaped articles, depending on the particular sintering process used.

Good high temperature strength properties of the shaped articles are often of decisive importance, particularly when the articles are intended for use in severe environments for high-temperature engineering such as, for example, as parts for hot-gas turbines. By good high temperature strength properties, it is meant that the mechanical strength of the article (which is characterized by its flexural strength) shows no degradation even at high temperatures up to approximately 1600° C. A high density, however, is not alone a decisive criterion for good high temperature strength properties.

The oldest of the processes known for the manufacture of dense sintered shaped articles of silicon carbide is based on so-called reaction sintering in which silicon carbide powder is processed with carbon and/or an organic resin binder to form preshaped articles that are then heated in a silicon-containing atmosphere. The carbon reactions with the silicon to form additional silicon carbide; as a result, the silicon carbide grains already present are joined together and, at the same time, cavities are filled with excess silicon. Although the sintered articles thus obtained have a very high density since they are practically free of pores, they contain free silicon. Their suitability for use as materials in high-temperature engineering is therefore restricted since they tend to exude silicon (m.p. 1440° C.) at temperatures above about 1400° C.

Dense sintered shaped articles of silicon carbide can also be manufactured by the so-called hot-pressing or pressure-sintering process, using aluminum or boron as a sintering aid. Dense hot-pressed shaped articles of fine-grained α-silicon carbide containing 0.5 to 5% by weight of aluminum that does not appear as a separate phase in X-ray diffraction analysis have, for example, been described (see U.S. Pat. No. 3,836,673), but, although these articles have a flexural strength of over 7000 kgf/cm$^2$ (687 N/mm$^2$) at room temperature, this decreases sharply as the temperature rises and, at 1500° C., the flexural strength is only approximately 3140 kgf/cm$^2$ (308 N/mm$^2$). Thus, these articles are not resistant to high temperatures, which is confirmed by a substantially intergranular fracture mode. Hot-pressed shaped articles of fine-grained β-silicon carbide are known from U.S. Pat. No. 3,853,566 (which corresponds to DE-OS 23 63 036) that are produced using a boron-containing additive or boron carbide as sintering aids have also been described (see U.S. Pat. No. 3,853,566). Although these shaped articles have a flexural strength of only approximately 5600 kgf/cm$^2$ (549 N/mm$^2$) at room temperature, this flexural strength shows no degradation up to a temperature of approximately 1400° C., and falls to values below 4000 kgf/cm$^2$ (392 N/mm$^2$) only at temperatures of 1600° C. and above; the fracture mode is transgranular both at room temperature and also at higher temperatures. (For a summary of the flexural strengths and fracture modes of the above-mentioned sintered and hot pressed articles, see J. W. Edington et al., *Powder Metallurgy International*, vol. 7, No. 2, pages 82 ff (1975).)

It can thus be seen that, although shaped articles of silicon carbide having a very low porosity can be obtained using the hot-pressing or pressure-sintering process, these articles do not satisfy all the requirements with regard to high temperature strength. Furthermore, only relatively small and geometrically simple shaped articles can be obtained by this method since the possibilities of shaping are severely restricted in the case of pressure sintering. Moreover, in addition, the continuous operation of the hot-pressing process is very expensive.

An alternative process known for the sintering of ceramic materials is the pressureless sintering process which enables articles of complex shape to be manufactured relatively cheaply without the need for expensive final machining operations. Moreover, it can also be carried out in a continuous manner using pusher or band-type furnaces, thus permitting the economical mass production of shaped articles. Attempts have therefore been made to produce articles of silicon carbide by the pressureless-sintering process.

Based on experimental results which proved that the use of boron-containing additives as sintering aids in the hot-pressing of silicon carbide is advantageous as compared with the use of other sintering aids such as aluminium oxide or aluminium nitride, a process has been described in which a pulverulent mixture of β-silicon carbide, a boron-containing compound (0.3 to 3.0% by weight B) and a carbon-containing additive (0.1 to 1.0% by weight C) is shaped into a green body, which is then subjected to pressureless sintering in an inert atmosphere at temperatures of 1900° to 2100° C. to form a shaped sintered article having a density of at least 85% TD (per cent of the theoretical density of silicon carbide) (see U.S. Pat. No. 4,004,934). In order to obtain high densities however, for example, densities of above 95% TD, the pressureless-sintering process has to be carried out in the presence of flowing nitrogen gas, which is supposed to prevent or delay the phase transformation of β-SiC into α-SiC, which starts at temperatures of 1600° C. upward and which results in an exaggerated grain growth of the α-(6H)-phase. This phase transformation often results in the silicon carbide becoming coarse even before the final density is reached and this coarsening prevents further densification. The microstructure of such sintered articles then consists of large-tubualar α-SiC crystals embedded in a fine-grained β-SiC matrix.

Because of this structural inhomogeneity, the strength of such sintered articles is not sufficient for use in high-temperature engineering.

It has been suggested that these disadvantages can be overcome by using β-SiC powder in admixture with 0.05 to 5% by weight of α-SiC powder, said α-SiC powder having an average particle size of at least twice as large as that of the β-SiC powder, and subjecting this mixture to pressureless sintering with a boron-containing additive and a carbon-containing additive in a manner analogous to that described in U.S. Pat. No. 4,004,934 (see U.S. Pat. No. 4,014,117). The purpose of the addition of α-SiC in the form of a seeding powder is to bring about improved control of the grain growth during the sintering process since they assist a rapid transformation of the β-SiC into the thermodynamically more stable α-form so that at least 70% by weight of the SiC in the finished sintered article is in the α-form. The more uniform microstructure obtained by this means is, however, achieved at the cost of a lower density of the final product (the maximum density achieved according to the examples of the cited specification is 91.9% TD).

Certain sintering aids that have proved effective in the hot-pressing process in controlling the growth of the tabular α-SiC crystals, for example aluminum, silicon nitride, aluminum nitride and boron nitride, cannot be used in the pressureless sintering process since they interfere with the densification process and prevent obtaining high densities (see again U.S. Pat. No. 4,041,117).

A process is described in German Offenlegungschrift 26 24 642, by which it should also be possible to produce dense sintered shaped articles of silicon carbide by the pressureless sintering of the more readily accessible α-SiC powder in admixture with a boron-containing and carbon-containing additive. The process is, however, not limited to the use of α-SiC powder but also includes the use of β-SiC powder and mixtures of β-SiC and α-SiC powder. The sintered articles so obtained should have a density of at least 75% TD and, in addition to SiC, should contain 0.5 to 5% by weight of carbon from a carbonisable organic material, 0.15 to 3% by weight of boron and up to 1.0% by weight of additional carbon (for example, from boron carbide). As can be seen from the examples, densities of a maximum of 96% TD were obtained. Our own tests have shown that, even when using α-SiC powder as the starting material in this pressureless process with additives containing boron and carbon, at high sintering temperatures, exaggerated grain growth occurs, resulting in an inhomogeneous microstructure in the finished sintered article. Submicron SiC powders containing α-SiC in an amount of 97% and 100% of the total amount of silicon carbide were used for these tests, in each case with an additive containing 1% by weight boron and 2% by weight carbon. The pressureless sintering was carried out in a protective argon atmosphere at temperatures of 2050° to 2300° C. All the sintered articles so obtained had a density of approximately 96% TD but the samples sintered at 2100° C. and above had recrystallised to a large extent and their high temperature flexural strength was less than 300 N/mm². Only the samples sintered at 2050° C. had a homogeneous fine-grained microstructure with an average grain size of approximately 5 μm.

Thus, the pressureless sintering of silicon carbide with boron-containing additives is difficult to effect if sintered articles having both a high density and also a uniform fine-grained microstructure are to be obtained, since it is evident that, irrespective of the type of starting material used (α-SiC and/or β-SiC), exaggerated grain growth must be reckoned with because of the doping of the silicon carbide with boron and this catastrophic growth can be limited only by adhering to quite specific conditions. On the other hand, the observance of a narrow sintering temperature range, in particular, makes high demands on exact temperature control which are difficult to achieve in the high temperature ranges used and which means that the process cannot be carried out on an industrial scale without involving uneconomically high costs.

The present invention provides a sintered shaped article of polycrystalline silicon carbide having a density of at least 97% of the theoretical density of silicon carbide, a transgranular fracture mode, a flexural strength of at least 500 N/mm² up to 1600° C., and, preferably, a total porosity not exceeding 2% by volume, and consisting of at least 95.4% by weight of α-silicon carbide,
about 0.1 to 2.0% by weight of additional carbon
about 0.2 to 2.0% by weight of aluminum,
about 0 to 0.5% by weight of nitrogen, and
about 0 to 0.1% by weight of oxygen, the α-silicon carbide being in the form of a homogeneous microstructure with an average grain size of less than 10 μm.

The shaped articles of polycrystalline silicon carbide according to the invention have improved mechanical properties, particularly at high temperatures, and can be manufactured in a simple manner.

In the polycrystalline shaped articles according to the invention, the aluminum, and also the optionally present nitrogen and oxygen, are substantially in the form of a solid solution in the silicon carbide lattice so that they cannot be detected as a separate phase, for example, up to 2400-fold magnification. The additional carbon, on the other hand, can be detected as a separate phase in the form of equiaxial particles having a grain size of less than 2 μm. The shaped articles are electrically conductive at room temperature and this conductivity can be varied by varying the quantitative portion of nitrogen. The low residual oxygen content, which is preferably less than 0.05% by weight, is also of decisive importance for the good high temperature strength of the shaped articles.

The present invention also provides a process for the manufacture of a polycrystalline shaped article from pulverulent silicon carbide by pressureless sintering, which comprises (a) homogeneously mixing (i) pulverulent silicon carbide, substantially in the form of the α-modification and having a particle size distribution of 3 μm and finer, (ii) an aluminum-containing component, in an amount corresponding to from 0.3 to 3% by weight of free aluminum, based on the weight of the silicon carbide used, and (iii) a carbon-containing component consisting of amorphous carbon or of an organic material that can be coked to form amorphous carbon at a temperature not exceeding about 1000° C., in an amount corresponding to from 0.2 to 3% by weight of free carbon, based on the weight of the silicon carbide used; (b) moulding and shaping and resulting mixture into a preshaped green body having a density of at least 50% of the theoretical density of silicon carbide; and (c) sintering the preshaped article, in an atmosphere inert to silicon carbide or in vacuo, at a temperature within the range of from 2000° to 2300° C., to form a polycrystalline shaped article.

The silicon carbide powder used in the present process must have a particle size distribution not exceeding 3 μm and preferably has a particle size distribution not exceeding 1 μm (submicron powder). As the particle size of silicon carbide cannot be determined directly with sufficient accuracy in the submicron range, the specific surface area (measured according to the BET method described in ASTM Special Technical Publication No. 51, 1941, pages 95–105) may be used as a measure of the average particle size, according to the equation $$\bar{d} = 6/(S.\rho)$$

in which $\bar{d}$ denotes the average particle size in μm,
 S denotes the specific surface area in m$^2$/g, and
 ρ denotes the powder density in g/cm$^3$.

Silicon carbide powder having a specific surface area within the range of from 5 to 50 m$^2$g, especially from 10 to 20 m$^2$g, is preferably used.

The silicon carbide powder may be obtained with the necessary particle size by milling abrasive grade silicon carbide from the Acheson process and by subsequent grading by means of, for example, air classification or elutriation. Because of the high production temperature, silicon carbide produced by the Acheson process generally has a predominant percentage of the thermodynamically more stable α-modification. In particular, by sorting compact pieces from the inner zones of the silicon carbide roll formed in an Acheson resistance furnace, single phase α-silicon carbide can be obtained. The best results are generally obtained using such single phase α-silicon carbide submicron powder. Silicon carbide obtained from the Acheson process is advantageously pre-treated with hydrofluoric acid and/or nitric acid in order to remove foreign substances, in particular adherent silica and other oxygen-containing compounds that may interfere with the sintering operation and/or may result in an undesired increase in the residual oxygen content of the finished sintered article.

The presence of both the aluminum-containing component and the carbon-containing component, in the respective specified quantities, is important in carrying out the process according to the invention, because it has been shown that, when using only one of these two components, only very inadequate densification is achieved.

The aluminium-containing component is advantageously used in powder form, preferably with a particle size distribution not exceeding 5 μm (micron powder) and especially not exceeding 1 μm (submicron powder). The aluminium-containing component may be either aluminium metal or an aluminium compound, although it is also possible to use silicon carbide powder doped with aluminium and/or nitrogen. Aluminium carbide, aluminium nitride and/or aluminium silicocarbide have proved to be suitable aluminium compounds for this purpose. The use of oxidic aluminium compounds such as aluminium oxide, is, however, not advantageous since these may result in undesirably high residual oxygen contants in the finished sintered article.

The aluminum-containing additive is used in a quantity corresponding to from 0.3 to 3% by weight of free aluminium, based on the silicon carbide used. Quantities smaller than 0.3% by weight of aluminium are practically ineffective for the desired purpose, that is to say, it is not possible to achieve sufficient densification of the silicon carbide with such quantities, whereas quantities greater than 3.0% by weight of aluminium, provide no advantage and there is a danger that the oxidation resistance of the silicon carbide would be reduced thereby. The best results with regard to densification are obtained with aluminium-containing components in quantities that, depending on the other additives and the particular sintering temperature applied, result in sintered articles having a content of from about 0.3 to 1.5% by weight of aluminium.

The use of nitrogen-free aluminium-containing components can result in sintered articles that have a very low electrical conductivity at room temperature and contain α-silicon carbide doped almost exclusively with aluminium, whereas when using nitrogen-containing aluminium compounds and/or nitrogen-doped silicon carbide powder, sintered articles having a high electrical conductivity at room temperature can be obtained, the aluminium and nitrogen being substantially in the form of a solid solution in the silicon carbide lattice. The conductivity of the sintered article can therefore be altered by varying the nitrogen content in the starting material and can thus be adapted accurately to a specific purpose, which is of advantage, for example, for subsequent electro-erosion machining of the sintered articles.

The introduction of nitrogen during the sintering process by using a protective gas atmosphere containing nitrogen has not proved advantageous since quantitatively accurate doping cannot be achieved in this manner and because the increase in the sintering temperature necessary in this case makes it more difficult to carry out the process.

The presence of amorphous carbon, in the specified quantity, at the commencement of sintering is essential, because it has been shown that industrially produced α-silicon carbide powder cannot be densified by using an aluminum containg additive alone to more than about 85% TD at temperatures from 2000° to 2300° C., without the addition of a carbon-containing component, even though industrially produced α-silicon carbide generally already contains up to about 2% by weight of additional carbon. This is probably because the free carbon in carbon-rich α-silicon carbide powders is in the form of graphite, which is not sufficiently active to give the desired results.

The α-silicon carbide therefore has first to be mixed with a carbon-containing component which either consists of amorphous carbon or which will coke to form amorphous carbon at a temperature of up to about 1000° C. In the former case, the amorphous carbon may, for example, be carbon black, for example acetylene black, advantageously having a specific surface area within the range of from 10 to 400 m$^2$/g. In this case, it is advantageous to use a small amount of a temporary binder in the silicon carbide/carbon black mixture, for example polyvinyl alcohol, stearic acid, or camphor, in an amount of up to about 1% by weight, based on the weight of the silicon carbide.

It is preferred, however, to use a carbon-containing component that will coke to form amorphous carbon and, in this case, this component may be solid or liquid at room temperature. Suitable substances for use as this component are, for example, coal-tar pitch and phenolic resins (for example "Phenoplast" (Trade Mark)), especially phenol/formaldehyde condensation products of the novolak and resole types, which will coke at temperatures of from 100° to 900° C. to form amorphous carbon in a yield of from 35 to 50%.

The amount of amorphous carbon in the mixture should be within the range of from 0.2 to 3% of free carbon, based on the weight of the silicon carbide. Amounts below about 0.2% by weight are not sufficiently effective for the desired purpose, that is to say, sufficient densification of the silicon carbide cannot be achieved with such amounts, and amounts above about 3% by weight give no advantage and there is a danger of a reduction in the flexural strength of the finished articles at room temperature and, especially, at high temperatures. Advantageously, a free carbon content within the range of from 0.2 to 2% by weight and, especially, from 0.5 to 1% by weight, based on the silicon carbide, is used.

In carrying out the process according to the invention, first the silicon carbide is homogeneously mixed with the aluminium-containing component and the carbon-containing component and, optionally, a temporary binder. Such homogeneous mixing is advantageously effected by carrying out the mixing in an organic solvent for example acetone or an aliphatic alcohol having up to 6 carbon atoms. When the carbon-containing component is amorphous carbon, the temporary binder is advantageously first dissolved in the solvent and then the silicon carbide powder, the aluminium-containing component and the amorphous carbon may be dispersed in the solution of the temporary binder. On the other hand, when the carbon-containing component is an organic material that will coke to form amorphous carbon, this carbon-containing component is advantageously first dissolved or dispersed in the solvent, and the silicon carbide powder and the aluminium-containing component may then be dispersed in the resulting dispersion or solution. Dispersion of the silicon carbide and other components in the solvent may be effected in a known manner. For example, if the amount of solvent present is sufficient to give a thin liquid suspension, dispersions may be effected simply by mechanically stirring the suspension in a plastics container, whereas, if the amount of solvent present is sufficient to give only a thick liquid suspension, dispersion may be effected by kneading in a conventional kneading device. The solvent is then removed to leave a homogeneous mixture of silicon carbide, the aluminium-containing component and the carbon-containing component. In the case of a thin liquid suspension, removal of the solvent may be effected by spray drying or freeze drying and, in the case of a thick liquid suspension, removal of the solvent may be effected by evaporation during kneading.

The homogeneous mixture is then moulded and shaped under pressure to give a preshaped article having a density of at least 50% TD. Moulding and shaping into the desired form may be achieved by means of conventional techniques, for example, die pressing, isostatic pressing, injection moulding, extrusion, or slip casting. When using die pressing or isostatic pressing, the pressure applied may be within the range of from 300 to 6000 bar, preferably from 1000 to 3000 bar.

If the carbon-containing component used is a self-hardening resole, the preshaped article may next be heated in an additional process stage to harden the synthetic resin. This is particularly advantageous if a sintered article having a geometrically complicated shape is to be produced by machining the preshaped article, since the preshaped article has a greater strength after hardening of the synthetic resin binder and is thus easier to machine than immediately in the "as pressed" state. This additional preheating step is advantageously carried out in a drying chamber at a temperature within the range of from 80° to 150° C. If, however, no such treatment is necessary and the nature of the surface of the end product is not particularly important, the preshaped article may be sintered immediately after moulding and shaping. During sintering, the article generally undergoes some shrinkage and this should be taken into account in determining the final dimensions of the sintered article. The dimensions after sintering depend on the density of the preshaped article (that is to say the green density) and on the density of the final sintered body and may be calculated from this in a known manner. In the production of the desired sintered silicon carbide articles according to the present invention, a linear shrinkage of about 15-17% is generally observed based on a green density of about 60% TD.

After moulding and shaping and, if carried out, after the additional heating step and anysubsequent machining, the preshaped article is subjected to pressureless sintering at a temperature within the range of from 2000° to 2300° C. This temperature range is important in obtaining the desired properties, because it has been shown that, under the same conditions but at lower temperature, sintered articles having densities below 90% TD are obtained, while, at higher temperatures, decomposition phenomena or sublimation of the silicon carbide occurs. When the carbon-containing component used is an organic material that will coke to form amorphous carbon, such coking will occur while heating the preshaped article to the sintering temperature. Thus, at the commencement of sintering above 1600° C., the carbon is already present in amorphous form, irrespective of the type of carbon-containing component initially used.

The preshaped article to be sintered may be accommodated in an inert container, for example in a graphite crucible, which is introduced into the heating zone of a high-temperature furnace provided with means to control the furnace atmosphere. Sintering is preferably carried out in an inert gas atmosphere, in which case it is advantageously carried out at about normal pressure, that is at about 1.01 bar. Suitable inert gases for this purpose are hydrogen, carbon monoxide, and, especially, the noble gases, for example argon and helium. Alternatively, sintering may be carried out in vacuo, especially at a pressure not exceeding 20 mbar.

Sintering of the preshaped article may be effected in a conventional high-temperature furnace, for example in a graphite-tube resistance furnace, an induction-heating furnace or, for continuous operation, a pusher or band-type furnace (in which the articles are transported through the heating zone in such a manner that they are maintained at the desired temperature for a predetermined period). The heating program used (that is to say, the rates of heating and cooling, and the duration at the sintering temperature) depnds on the size of the articles to be sintered. Small articles, that is those weighing only a few grams, are relatively insensitive to the temperature program and can be heated to the sintering temperature fairly rapidly, that is over a period of from about 60 to 120 minutes, and may be maintained at the sintering temperature for a period of about 15 minutes. Larger articles require a longer heating period in order to avoid temperature gradients in the article during heating and cooling. Generally, however, depending on the size and shape of the article, dwell times at the maximum sintering temperature used within the range of from 10 to 60 minutes are sufficient to achieve densities of at least 97% TD. Too long a dwell time at temperatures of from 2250° to 2300° C. should be avoided as this may result in a coarse-grained microstructure with a consequent degradation in the mechanical strength of the sintered article.

An important advantage of the process according to the invention is that, in contrast to previously known pressureless sintering processes in which a boron-additive and a carbon-additive are used, it is not necessary to maintain an exact sintering temperature for example, within the range of from 2060° to 2100° C., which can be difficult at these high temperatures, but that there is a relatively broad temperature range of from 2000° to 2300° C. over which the sintered articles may be obtained with the desired properties.

BRIEF DESCRIPTION OF DRAWINGS

The above-described method of carrying out the process according to the invention is summarized in the flow diagram shown in FIG. 1 of the accompanying drawings.

The dense sintered polycrystalline shaped articles of silicon carbide manufactured according to the process of the invention have sintered densities of at least 97% TD (which corresponds to residual porosities not exceeding 2% by volume), and flexural strengths of at least 500 N/mm$^2$ at room temperature and show no strength-degradation up to temperatures of at least 1600° C. Fracture reveals a transgranular appearance at all temperatures.

These results are particularly surprising as it has previously been thought that additives, such as aluminium, silicon nitride or aluminium nitride, would interfere with the densification process in the pressureless-sintering of silicon carbide and prevent the attainment of high densities.

Sintered articles according to the invention are suitable for use in high-temperature engineering (hot-gas turbines), in the field of abrasion engineering (drawing dies, cutting platelets, slide ring sealings) and in electrical engineering (semiconductors, heating elements).

Figure 5:
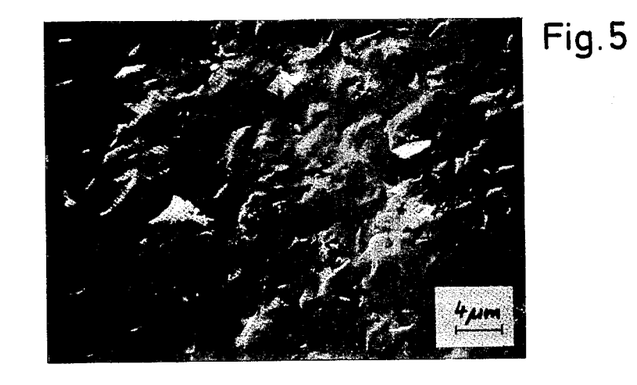
FIG. 5 of the accompanying drawings is a photomicrograh, with a 2400-fold magnification, showing the back-scatter electron image of a fresh fracture surface of a silicon carbide sintered article produced by the pressureless sintering process according to the invention using 2.5% AlN and 2% C.

The transgranular fracture mode and the homogeneously dispersed carbon (black phase) can be seen clearly.

Table 1 below indicates the limit values of the electrical resistances at room temperature, together with the corresponding aluminum and nitrogen contents, of sintered articles produced according to the process of the invention.

TABLE I

| Al and N content of SiC sintered article | | Electrical resistance at 20° C. |
|---|---|---|
| % by weight Al | ppm N | ohm.cm |
| 1.25 | 2500 | 1.2 |
| 0.60 | <50 | >10$^4$ |

The following examples illustrate the manufacture of dense sintered shape articles of silicon carbide according to the invention and, for comparison purposes, also illustrate the attempted manufacture of such articles while omitting the carbon-containing or aluminium-containing component. All parts and percentages are by weight unless otherwise stated.

EXAMPLE 1

An α-SiC submicron powder having a specific surface area of 15.8 m$^2$/g (corresponding to an average particle size of 0.12 μm), a commerical pulverulent phenol/formaldehyde resin of the novolak type, an aluminium nitride submicronpowder having a specific surface area of 11.0 m$^2$/g, and also acetone as the solvent for the novolak powder, were used as starting materials. According to the results of X-ray diffraction analysis, the SiC powder had an α-phase portion of 100%, 2.5 parts of the aluminium nitride powder (corresponding to approximately 1.5% Al) and 3.5 parts of the novolak powder (corresponding to approximately 1% C.) in the form of a solution in acetone were added to 100 parts of the silicon carbide powder and the thick liquid paste thus formed was kneaded in the air until practically all of the solvent had evaporated and only a slight smell of acetone was detectable. Approximately 100 ml of novolak solution were generally used for every 100 g of SiC powder and the kneading period was approximately 60 minutes. The crumbly powder obtained after kneading, which was dry to the touch, was then pressed in rubber bags under a pressure of 2000 bar for 2 minutes to form prismatic shaped articles having the approximate measurements 6×6×50 mm and a green density of 60 to 62% TD. The green compacts were then sintered at 2150° C. in a stream of argon under a pressure of approximately 1.01 bar in a graphite crucible which had been placed in the heating zone of a Tammann-type graphite-tube furnace. Before heating, the furnace chamber had been flushed several times with purified argon gas. The sintering was carried out according to the following temperature program:

| | | | |
|---|---|---|---|
| 20° C. | to | 400° C. | 30 min |
| 400° C. | to | 1400° C. | 25 min |
| maintain | at | 1400° C. | 30 min |
| 1400° C. | to | 2150° C. | 30 min |
| maintain | at | 2150° C. | 15 min. |

After the dwell-time at 2150° C., the furnace was switched off and the sintered articles were cooled to room temperature in the furnace. The sintered articles underwent 16% linear shrinkage, based on the length of the unsintered and sintered compacts, and had an average density of 3.156 g/cm$^3$, corresponding to 98.3% TD (density of pure SiC: 3.21 g/cm$^3$). Analysis revealed a total carbon content of 30.8%, an aluminium content of 1.19%, a nitrogen content of 2500 ppm, and an oxygen content of 400 ppm. Examination of the microstructure revealed an average of SiC grain size of 5 μm and homogeneously dispersed carbon in very small quantities having a grain size not exceeding 1 μm. The flexural strengths of the sample articles, machined to the final dimensions 3×3×35 mm, are listed in Table 2 below according to the test temperature. The flexural strength was measured in accordance with the threepoint method at a span width of 25 mm, and the values given are average values from 5 measurements. The fracture surface of the test bars had a transgranular appearance in all cases.

TABLE 2

| Test temperature (° C.) | Flexural strength (N/mm$^2$) |
| --- | --- |
| 20 | 560 |
| 1000 | 590 |
| 1200 | 620 |
| 1400 | 640 |
| 1600 | 630 |

EXAMPLES 2-5

A SiC submicron powder, obtained by classification of industrial SiC ultra fine-grain fractions and having a phase composition of 97% and α-SiC and 3% β-SiC and a specific surface area of 19.3 m$^2$/g was used as the SiC powder; a phenol resin of resole stage A (test series "A") and carbon black having a specific surface area of 150 m$^2$/g (test series "B") were used as carbon-containing components, both in a quantity corresponding to 2% C., based on the SiC used, or (for comparison purposes) no carbon-containing component was used (test series "C"); elemental aluminium (Example 2), aluminium silicocarbide (Example 3), aluminium-carbide (Example 4), and aluminium nitride (Example 5) were used as aluminium-containing components, all in a quantity corresponding to 1% Al, based on the SiC used; and acetone was used as the solvent.

Mixing and homogenising of all powder mixtures, and the production of the green compacts, was carried out as described in Example 1. The cold-ressed articles obtained, having green densities of over 60% TD, were then heated in a drying chamber in the presence of air for 60 minutes to 110° C., and then allowed to cool. After cooling, only the green compacts of series "A" could be machined; those of test series "B" and "C" did not have a sufficient green strength for this. All the green compacts were then sintered in an argon atmosphere at 2150° C. as described in Example 1. The results are listed in Table 3.

TABLE 3

| | Al-containing component | | Sintered densities (% TD) | | |
| --- | --- | --- | --- | --- | --- |
| | | | series | | |
| Example No. | amount and type | particle size (μm) | "A" | "B" | "C" |
| 2 | 1% Al | <5 | 98.6 | 97.2 | 75.1 |
| 3 | 1.7% Al$_4$SiC$_4$ | <3 | 97.0 | 97.1 | 69.9 |
| 4 | 1.3% Al$_4$C$_3$ | <1 | 97.5 | 97.4 | 72.2 |
| 5 | 1.5% AlN | <1 | 98.3 | 98.1 | 79.8 |

TABLE 3-continued

These results show that the process according to the invention can be carried out irrespective of the type of aluminium-containing component and carbon-containing component (series "A" and "B"), but that insufficinet densification is obtained with an aluminium-containing component alone, without a carbon-containing component (series "C").

EXAMPLES 6-11

Single phase α-SiC submicron powder (100% α-phase portion) having specific surface area of 14.7 m$^2$/g; a phenol/formaldehyde novolak as the carbon-containing component, in the form of a solution in acetone, in the amounts given in Table 4; and, in Examples 9-11 only, 0.75% of aluminium metal, based on the SiC used, were mixed, cold-pressed and sintered as described in Example 1. The results given in Table 4, show that sufficient densification is not achieved without an aluminium-containing additive (Examples 6 to 8).

TABLE 4

| Example No. | C-component (%) | Al-component (%) | Sintered density (% TD) |
| --- | --- | --- | --- |
| 6 | 0.5 | none | 69.8 |
| 7 | 1.5 | none | 80.1 |
| 8 | 3.0 | none | 75.2 |
| 9 | 0.5 | 0.75 | 98.0 |
| 10 | 1.5 | 0.75 | 98.7 |
| 11 | 3.0 | 0.75 | 97.5 |

EXAMPLES 12-15

Figure 1:
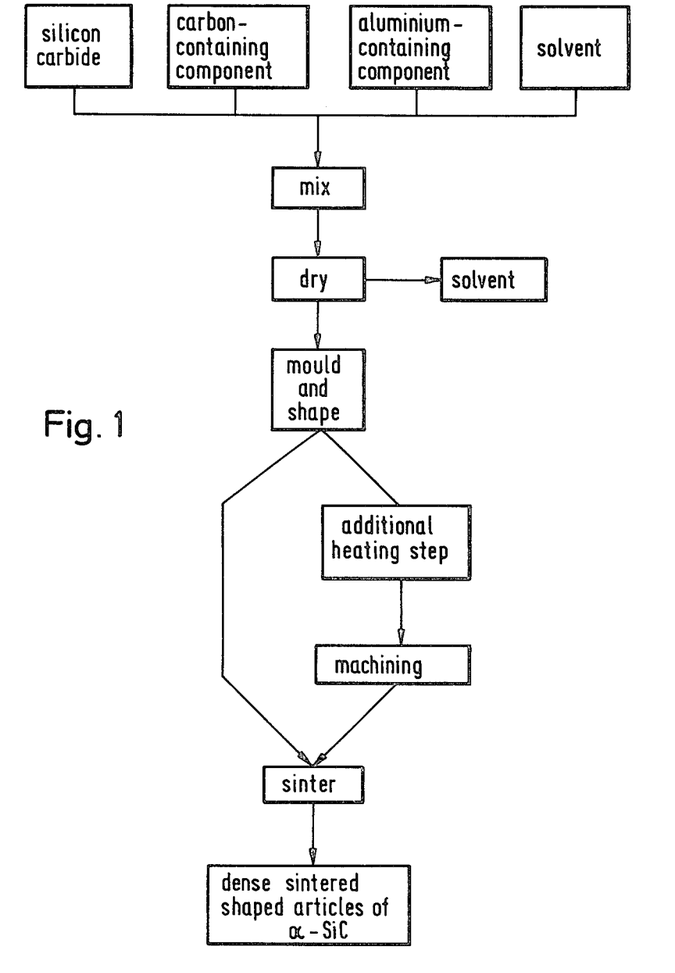
Figure 2:
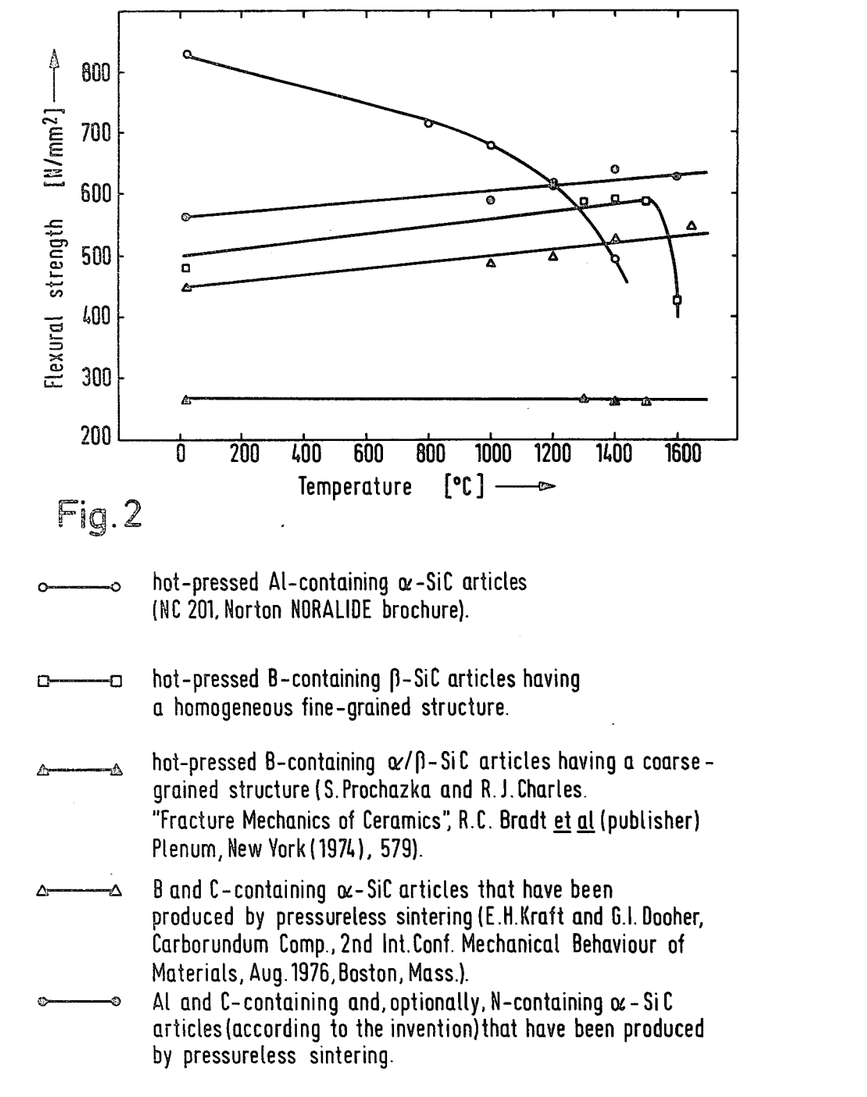
FIG. 2 of the accompanying drawings shows a graph in which flexural strength is plotted against temperature, in order to compare the room temperature and high temperature strengths of a sintered silicon carbide article manufactured according to the invention with various hot pressed and sintered silicon carbide articles manufactured according to prior art processes.
Figure 3:
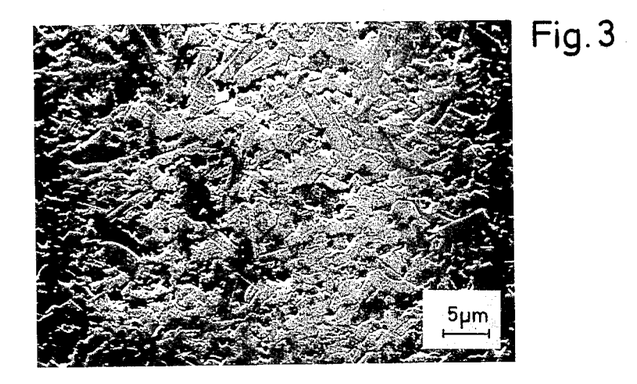
FIGS. 3 and 4 of the accompanying drawings are photomicrographs with a 2000-fold magnification showing the microstructure of silicon carbide sintered articles manufactured by the pressureless sintering process of the invention, using 1% Al and 0.75% C., at sintering temperatures of 2050° and 2250° C., respectively. The average grain size of both sintered articles is less than 10 μm. The silicon carbide grains are prismatic and show aspect/ratios of 2:1 to 5:1.
Figure 4:
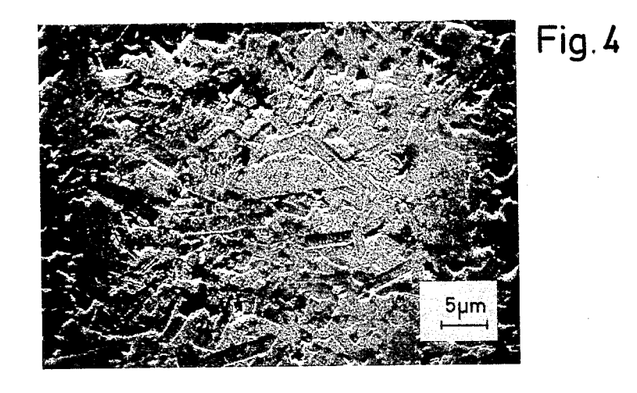

An α-SiC powder having a particle size finer than 3 μm; 1% of aluminium metal powder, as the aluminium-containing component; and novolak powder, as the carbon-containing component, in an amount corresponding to 0.75% C., based on the SiC used; were mixed, coldpressed and sintered as described in Example 1, except that the sintering temperature and sintering atmosphere were varied as indicated in Table 5. The argon atmosphere was at a pressure of 1.01 bar, and the vacuum was about 10 torr (13.3 mbar). The C content indicated in the analysis in Table 5 is the total carbon content. The results given in Table 5 show that, at a sintering temperature of 2050° C. and also at the comparatively high sintering temperature of 2250° C., and irrespective of the choice of sintering atmosphere (protective gas or vacuum), sintered articles having a SiC content of over 98.5% by weight are obtained having room temperature and high temperature strengths of over 500 N/mm$^2$. FIGS. 3 and 4 show the homogeneous microstructure of the polished surfaces, etched with boiling alkaline ferric cyanide solution, of the sintered articles of Examples 12 and 13. It can be seen that, despite raising the sintering temperature by 200° C., there was practically no coarsening of the grains in Example 13 as compared with Example 12.

TABLE 5

| Example No. | Sintering temperature (° C.) | Sintering atmosphere | Sintered density (% TD) | Flexural strength (N/mm²) at 20° C. | Flexural strength (N/mm²) at 137° C. | analysis of the sintered articles % Al | % C | ppm O | ppm N |
| --- | --- | --- | --- | --- | --- | --- | --- | --- | --- |
| 12 | 2050 | argon | 98.9 | 530 | 630 | 0.67 | 30.5 | 500 | 400 |
| 13 | 2250 | argon | 98.5 | 580 | 595 | 0.74 | 30.7 | 400 | 300 |
| 14 | 2050 | vacuum | 98.7 | 519 | 610 | 0.70 | 30.5 | <100 | <50 |
| 15 | 2250 | vacuum | 97.1 | 501 | 522 | 0.71 | 30.6 | <100 | <50 |

What is claimed is:

1. A sintered shaped article of polycrystalline silicon carbide having a density of at least 97% of the theoretical density of silicon carbide, a transgranular fracture mode, a flexural strength of at least 500 N/mm² up to 1600° C., and consisting essentially of at least 95.4% by weight of α-silicon carbide,
   about 0.1 to 2.0% by weight of additional carbon,
   about 0.2 to 2.0% by weight of aluminium,
   about 0 to 0.5% by weight of nitrogen, and
   about 0 to 0.1% by weight of oxygen,
the α-silicon carbide being in the form of a homogeneous microstructure with an average grain size of less than 10 μm.

2. A sintered shaped article as claimed in claim 1, having a total porosity of less than 2% by volume.

3. A process for the production of shaped articles of claim 1 or 2 by pressureless sintering which comprises:
   (a) forming a homogeneous mixture of
      (1) pulverulent silicon carbide, substantially in the α-form, having a particle size of less than 3 μm;
      (2) an aluminum containing additive in an amount of about 0.3 to 3% by weight of free aluminum, based on the weight of silicon carbide;
      (3) a carbon-containing additive selected from the group consisting of amorphous carbon, and a material which can be coked at temperatures below about 1,000° C. to form amorphous carbon, or mixtures thereof, in an amount between about 0.2 and 3% by weight of free carbon, based on the weight of silicon carbide;
   (b) molding and shaping said mixture into a green body having a density of at least 50% of the theoretical density of silicon carbide; and
   (c) sintering said body in an atmosphere, inert to silicon carbide or in a vacuum, at a temperature from about 2000° C. to 2300° C. until a polycrystalline shaped article is formed.

4. A process according to claim 3, wherein the silicon carbide powder exlusively in the form of the α-modification is used.

5. A process according to claim 3 or 4, wherein a silicon carbide powder doped with nitrogen and/or aluminum is used.

6. A process according to claim 3 or 4 or 5, wherein a silicon carbide powder having a specific surface area of 5 to 50 m²/g is used.

7. A process according to claim 6, wherein the silicon carbide powder has a specific surface area of 10 to 20 m²/g.

8. A process according to claim 3, wherein the aluminum-containing additive is used in powder form having a particle size of less than 5 μm.

9. A process according to claim 7, wherein the aluminium-containing additive is aluminium metal.

10. A process according to claim 8, wherein the aluminium additive is selected from the group consisting of aluminium carbide, aluminium nitride, aluminium silicocarbide or a mixture thereof.

11. A process according to claim 3, wherein carbon black having a specific surface area of 10 to 400 m²/g is used as the carbon-containing additive.

12. A process according to claim 3, wherein a phenol/formaldehyde condensation product or coal-tar pitch is used as the carbon-containing additive.

13. A process according to claim 3 or 12, wherein the pre-shaped articles are subjected to thermal treatment at temperatures in the range of from 80° to 150° C. before being sintered.

14. A process according to claim 3, wherein the preshaped articles are sintered in an inert gas atmosphere at normal pressure.

15. A process according to claim 3, wherein the preshaped articles are sintered in vacuo.

16. A process according to claim 15, wherein the sintering is carried out at a pressure not exceeding 20 mbar.

17. A process according to claim 3, wherein the silicon carbide has a particle size distribution not exceeding 1 μm.

18. A process according to claim 3, wherein the carbon-containing additive is used in an amount corresponding to from 0.2 to 2% by weight of free carbon, based on the weight of the silicon carbide.

19. A process according to claim 18, wherein the carbon-containing additive is used in an amount corresponding to from 0.5 to 1% by weight of free carbon, based on the weight of the silicon carbide.

20. A process according to claim 18, wherein the carbon-containing additive is acetylene black.

21. A process according to claim 18, wherein the carbon-containing additive is coal-tar pitch or a phenolic resin.

22. A process according to claim 18, wherein the carbon-containing additive is a phenol/formaldehyde condensation product.

23. A process according to claim 13, wherein, subsequent to the heating step and prior to sintering, the preshaped article is machined.

* * * * *

UNITED STATES PATENT AND TRADEMARK OFFICE
CERTIFICATE OF CORRECTION

PATENT NO. : 4,230,497

DATED : October 28, 1980

INVENTOR(S) : Karl A. Schwetz, et al

It is certified that error appears in the above—identified patent and that said Letters Patent is hereby corrected as shown below:

Column 1, line 19: "tecnhology" should be --technology--.

line 45: "reactions" should be --reacts--.

Column 5, lines 22 & 23: "$m^2g$" should be --$m^2/g$--.

line 63: "contants" should be --contents--.

Column 8, line 58: "depnds" should be --depends--.

Column 9, line 65: "A1N" should be --AlN--.

Column 10, line 15: "carbode" should be --carbide--.
Column 11, line 31: "97% and α-SiC" should be --97% α-SiC--.
Column 11, line 49: "cold-ressed" should be --cold-pressed--.

Column 12, lines 13-14: "insufficinet" should be --insufficient--.

line 20: "having specific surface" should be --having a specific surface--.

Column 13, Table 5, column 6: "137°C" should be --1370°C--.

UNITED STATES PATENT AND TRADEMARK OFFICE
CERTIFICATE OF CORRECTION

PATENT NO. : 4,230,497
DATED : October 28, 1980
INVENTOR(S) : Karl A. Schwetz, et al It is certified that error appears in the above—identified patent and that said Letters Patent is hereby corrected as shown below:

Column 13, line 49: "exlusively" should be --exclusively--.

Signed and Sealed this

Nineteenth Day of October 1982

[SEAL]

Attest:

Attesting Officer

GERALD J. MOSSINGHOFF
Commissioner of Patents and Trademarks